United States Patent
Pfister et al.

(10) Patent No.: US 10,511,534 B2
(45) Date of Patent: Dec. 17, 2019

(54) STATELESS DISTRIBUTED LOAD-BALANCING

(71) Applicant: Cisco Technology, Inc., San Jose, CA (US)

(72) Inventors: Pierre Pfister, Angers (FR); Yoann Desmouceaux, Paris (FR); William Mark Townsley, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/947,425

(22) Filed: Apr. 6, 2018

(65) Prior Publication Data

US 2019/0312811 A1   Oct. 10, 2019

(51) Int. Cl.
| | |
|---|---|
| *H04L 12/28* | (2006.01) |
| *H04L 12/803* | (2013.01) |
| *H04L 12/801* | (2013.01) |
| *H04L 12/911* | (2013.01) |
| *H04J 1/16* | (2006.01) |

(52) U.S. Cl.
CPC .......... *H04L 47/125* (2013.01); *H04L 47/34* (2013.01); *H04L 47/726* (2013.01)

(58) Field of Classification Search
CPC .............................. H04L 47/34; H04L 47/125
USPC .................................. 370/229, 252, 386, 389
See application file for complete search history.

(56) References Cited

U.S. PATENT DOCUMENTS

| | | |
|---|---|---|
| 5,774,660 A * | 6/1998 | Brendel ............. H04L 29/06 709/201 |
| 5,812,773 A | 9/1998 | Norin |
| 5,889,896 A | 3/1999 | Meshinsky et al. |
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — John Pezzlo

(74) *Attorney, Agent, or Firm* — Polsinelli PC

(57) ABSTRACT

Aspects of the subject technology provide state-less load-balancing using sequence numbers to identify traffic flows. In some implementations, a process of the technology can include steps for receiving, by a load-balancer, a first packet from a source device including a request to access the service provided by a server coupled to the load-balancer, determining a load for each of the servers, wherein each server is associated with a unique set of sequence numbers, and forwarding the request to a target server selected based on its corresponding load, and wherein the request is configured to cause the target server to issue a reply to the source device. Systems and machine-readable media are also provided.

17 Claims, 5 Drawing Sheets

(56) References Cited

U.S. PATENT DOCUMENTS

| | | |
|---|---|---|
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |

(56) References Cited

U.S. PATENT DOCUMENTS

| | | |
|---|---|---|
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |

(56) References Cited

U.S. PATENT DOCUMENTS

| | | |
|---|---|---|
| 2014/0310418 A1* | 10/2014 | Sorenson, III ...... H04L 67/1002 709/226 |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0178133 A1 | 6/2015 | Phelan et al. |
| 2015/0189009 A1 | 7/2015 | van Bemmel |
| 2015/0189010 A1* | 7/2015 | van Bemmel ...... H04L 67/1014 709/203 |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2016/0359872 A1* | 12/2016 | Yadav ...................... H04L 43/04 |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: the Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, a White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, a White Paper from the Open Cloud Standards Incubator," Version 1.0.0, Document No. DSP-IS0101, Nov. 11, 2009, 21 pages.

Author Unknown, "Microsoft Cloud Edge Gateway (MCE) Series Appliance," Iron Networks, Inc., 2014, 4 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

Author Unknown, "Real-Time Performance Monitoring on Juniper Networks Devices, Tips and Tools for Assessing and Analyzing Network Efficiency," Juniper Networks, Inc., May 2010, 35 pages.

Author Unknown, "Use Cases and Interactions for Managing Clouds, a White Paper from the Open Cloud Standards Incubator," Version 1.0.0, Document No. DSP-ISO0103, Jun. 16, 2010, 75 pages.

Author Unknown, "Apache Ambari Meetup What's New," Hortonworks Inc., Sep. 2013, 28 pages.

Author Unknown, "Introduction," Apache Ambari project, Apache Software Foundation, 2014, 1 page.

Beyer, Steffen, "Module "Data::Locations?!"," YAPC::Europe, London, UK,ICA, Sep. 22-24, 2000, XP002742700, 15 pages.

Borovick, Lucinda, et al., "Architecting the Network for the Cloud," IDC White Paper, Jan. 2011, 8 pages.

Bosch, Greg, "Virtualization," last modified Apr. 2012 by B. Davison, 33 pages.

(56) References Cited

OTHER PUBLICATIONS

Broadcasters Audience Research Board, "What's Next," http://lwww.barb.co.uk/whats-next, accessed Jul. 22, 2015, 2 pages.

Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.

Cisco Systems, Inc., "Cisco Unified Network Services: Overcome Obstacles to Cloud-Ready Deployments," Cisco White Paper, Jan. 2011, 6 pages.

Cisco Systems, Inc., "Cisco Intercloud Fabric: Hybrid Cloud with Choice, Consistency, Control and Compliance," Dec. 10, 2014, 22 pages.

Cisco Technology, Inc., "Cisco Expands Videoscape TV Platform Into the Cloud," Jan. 6, 2014, Las Vegas, Nevada, Press Release, 3 pages.

Citrix, "Citrix StoreFront 2.0" White Paper, Proof of Concept Implementation Guide, Citrix Systems, Inc., 2013, 48 pages.

Citrix, "CloudBridge for Microsoft Azure Deployment Guide," 30 pages.

Citrix, "Deployment Practices and Guidelines for NetScaler 10.5 on Amazon Web Services," White Paper, citrix.com, 2014, 14 pages.

CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-pateway.php.

Fang K., "LISP MAC-EID-TO-RLOC Mapping (LISP based L2VPN)," Network Working Group, Internet Draft, CISCO Systems, Jan. 2012, 12 pages.

Gedymin, Adam, "Cloud Computing with an emphasis on Google App Engine," Sep. 2011, 146 pages.

Good, Nathan A., "Use Apache Deltacloud to administer multiple instances with a single API," Dec. 17, 2012, 7 pages.

Herry, William, "Keep It Simple, Stupid: OpenStack nova-scheduler and its algorithm", May 12, 2012, IBM, 12 pages.

Hewlett-Packard Company, "Virtual context management on network devices", Research Disclosure, vol. 564, No. 60, Apr. 1, 2011, Mason Publications, Hampshire, GB, Apr. 1, 2011, 524.

Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.

Kolyshkin, Kirill, "Virtualization in Linux," Sep. 1, 2006, XP055141648, 5 pages, https://web.archive.org/web/20070120205111/http://download.openvz.org/doc/openvz-intro.pdf.

Kunz, Thomas, et al., "OmniCloud—The Secure and Flexible Use of Cloud Storage Services," 2014, 30 pages.

Lerach, S.R.O., "Golem," http://www.lerach.cz/en/products/golem, accessed Jul. 22, 2015, 2 pages.

Linthicum, David, "VM Import could be a game changer for hybrid clouds", InfoWorld, Dec. 23, 2010, 4 pages.

Logan, Marcus, "Hybrid Cloud Application Architecture for Elastic Java-Based Web Applications," F5 Deployment Guide Version 1.1, 2016, 65 pages.

Lynch, Sean, "Monitoring cache with Claspin" Facebook Engineering, Sep. 19, 2012, 5 pages.

Meireles, Fernando Miguel Dias, "Integrated Management of Cloud Computing Resources," 2013-2014, 286 pages.

Mu, Shuai, et al., "uLibCloud: Providing High Available and Uniform Accessing to Multiple Cloud Storages," 2012 IEEE, 8 pages.

Naik, Vijay K., et al., "Harmony: a Desktop Grid for Delivering Enterprise Computations," Grid Computing, 2003, Fourth International Workshop on Proceedings, Nov 17, 2003, pp. 1-11.

Nair, Srijith K. et al., "Towards Secure Cloud Bursting, Brokerage and Aggregation," 2012, 8 pages, www.flexiant.com.

Nielsen, "SimMetry Audience Measurement—Technology," http://www.nielsen-admosphere.eu/products-and-services/simmetry-audience-measurement-technology/, accessed Jul. 22, 2015, 6 pages.

Nielsen, "Television," http://www.nielsen.com/us/en/solutions/measurement/television.html, accessed Jul. 22, 2015, 4 pages.

Open Stack, "Filter Scheduler," updated Dec. 17, 2017, 5 pages, accessed on Dec. 18, 2017, https://docs.openstack.org/nova/latest/user/filter-scheduler.html.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11$^{th}$ International Conference on Computer and Information Science, 2012 IEEE, 5 pages.

* cited by examiner

STATELESS DISTRIBUTED LOAD-BALANCING

TECHNICAL FIELD

The present technology pertains to load-balancing, and more specifically to stateless load-balancing achieved using sequence numbers to identify and balance traffic flows.

BACKGROUND

The ubiquity of Internet-enabled devices has created an enormous demand for Internet services and content. This Internet-connected revolution has created significant challenges for service and content providers who often struggle to service a high volume of user requests without falling short of user performance expectations. For example, providers typically need large and complex datacenters to keep up with network and content demands from users. These datacenters are generally equipped with server farms configured to host specific services, and include numerous switches and routers configured to route traffic in and out of the datacenters.

Not surprisingly, such large volumes of data can be difficult to manage and create significant performance degradations and challenges. Load-balancing solutions may be implemented to improve performance and service reliability in a datacenter.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
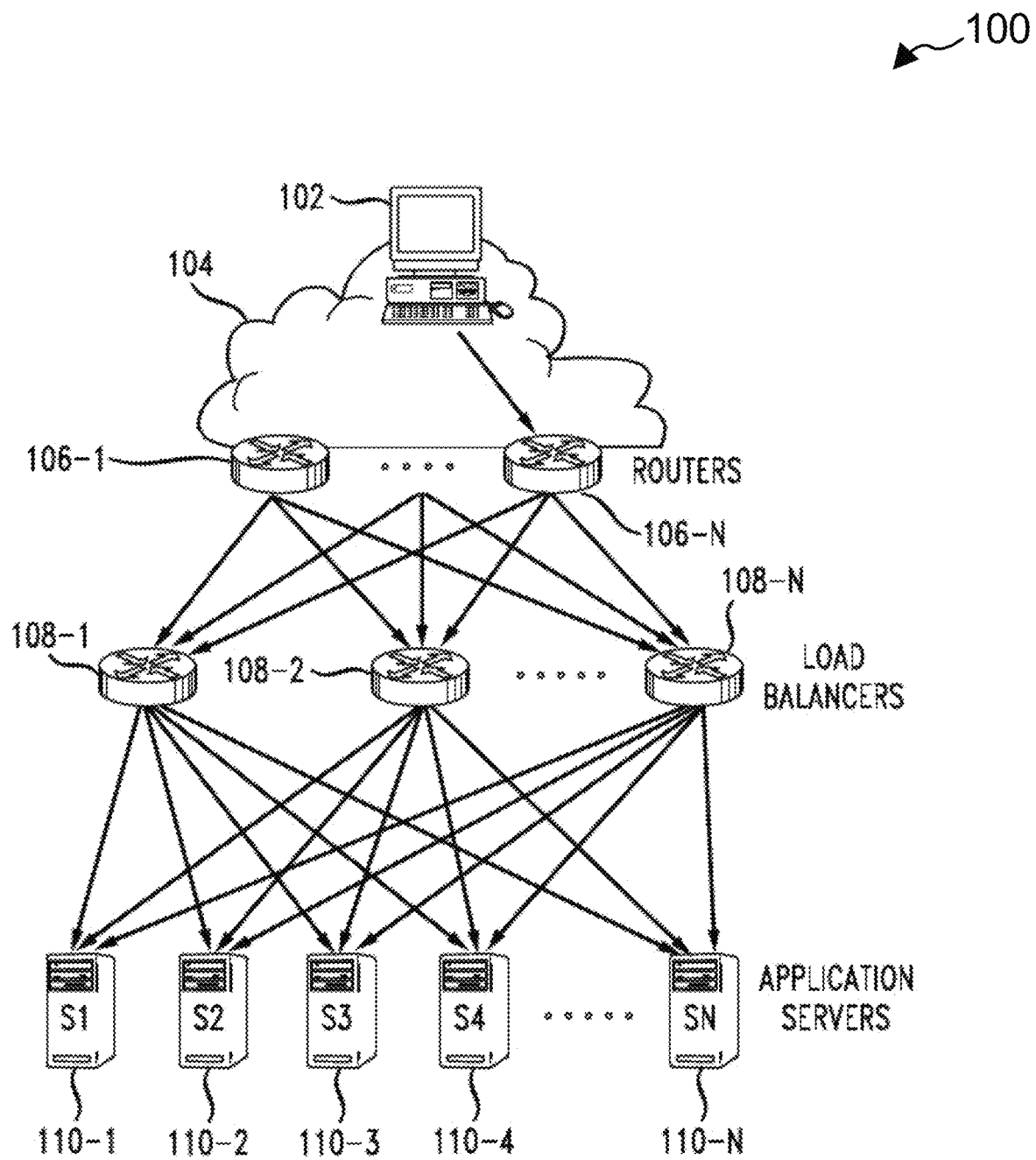
FIG. 1 illustrates an example network environment in which some aspects of the technology can be implemented.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Additional features and advantages of the disclosure are set forth in the description which follows, and in part can be learned by practice of the disclosed principles. The features and advantages of the disclosure can be realized and obtained by means of the instruments and combinations particularly pointed out in the appended claims. These and other features of the disclosure are fully apparent from the following description and appended claims, or can be learned by the practice of the principles set forth below.

Disclosed are systems, methods, and computer-readable media configured for providing stateless load-balancing between multiple servers. In some aspects, a process of the technology can include steps for receiving, by a load-balancer, a first packet from a source device, the first packet comprising a request to access a service provided by a server coupled to the load-balancer, determining, by the load-balancer, a load for each of a plurality of servers, wherein each of the plurality of servers is associated with a unique set of sequence numbers. In some aspects, the process can further include steps for forwarding the request to a target server selected from among the plurality of servers based on the determined load for each of the servers, and wherein the request is configured to cause the target server to issue a reply to the source device, the reply comprising a sequence number selected from the unique set of sequence numbers corresponding with the target server.

A process of the technology can further include operations for receiving, by the load-balancer, a second packet from the source device, wherein a header of the second packet contains the sequence number, and routing, by the load-balancer, the second packet to the target server based on the sequence number in the header of the second packet. In some instances, the sequence number of the second packet may be a value that is incremented based on an amount of data transmitted from the target server to the source device, for example, in a previous transmission frame.

As explained in further detail below, the load-balancer can be configured to determine when a sequence number for a corresponding stream exceeds (or is likely to exceed) a range of sequence numbers corresponding with the target server and, in response, to begin monitoring server states for the corresponding flow. Depending on the desired implementation, the sequence numbers can correspond with Transmission Control Protocol (TCP) sequence numbers.

DESCRIPTION

Conventional load-balancers typically either use a hash-based packet destination assignment process, or make routing decisions based on server loads. Both techniques have potential drawbacks. On one hand, hash-based destination assignments fail to take consideration of server loads, and can therefore be inefficient for traffic flows that are substantially larger (or smaller) and other flows being balanced. On the other hand, performing load-balancing based on measured server loads requires that the load-balancers store and routinely update information regarding server usage levels (e.g., CPU utilization), which can become onerous in highly dynamic network settings, such as implementations where a large number of servers are used, or where server loads are quickly changing.

Aspects of the disclosed technology address the foregoing problems of conventional load-balancer implementations by providing stateless load-balancing that is performed using traffic flow identifiers to parse flows between available servers. In some aspects, initial packet routing for a new flow is performed based on server load information, which can include, but is not limited to: CPU utilization for one or more servers, memory utilization, network-path information, and/or traffic flow information, etc. Additionally, in some aspects, server load information can include information regarding loads attributed to a specific process, container, and/or virtual machine, etc. In some aspects, server loads can relate to the use of memory resources, such as the fill level of one or more queues, or the number, size and/or type of requests queued. It is understood that server loads can be determined or measured using various metrics or network characteristics. By way of non-limiting example, server loads can be based on measures of: a number of requests per second (RPS), average response time (ART), peak response time (PRT), uptime, a number of threads, and/or a count of Open Files Descriptors (OFD), etc.

After an initial packet is received by the selected server (e.g., the target server) chosen by the load balancer, the target server responds to the source device and provides a unique identifier that is associated with the target server. The unique identifier can then be inserted, by the source device, into subsequent packets transmitted to the server. In some aspects, the unique identifier inserted by the source device is represented by a value that is based on the unique identifier received from the target server and a number of TCP bytes transmitted by the target server in a previous frame. By way of example, the unique identifier provided by the server may be 2000, with 1300 total bytes transmitted in the previous frame. Therefore, the unique identifier inserted by the source device may be 3300 (i.e., 2000+1300).

When the subsequent packets are received from the source device at the load-balancer, routing decisions can be made (i.e., to provide the same flow to the target server), based on the unique identifier in the packet metadata (header). As discussed in further detail below, each server can be associated with a predetermined range of unique identifiers (e.g., TCP sequence IDs), for example, that can be used to match flows/servers. As such, server-state information at the load balancer can be used to associate a specific flow with a given instance of an application on a server, without the need of the load balancer to persist and constantly update server-load information.

Additionally, in some aspects, the load balancers can be configured to detect when an upper bound of sequence numbers sent by the source device (e.g., client) are likely to exceed a range for the associated server. In such instances, the load balancer may again begin using server loads to perform balancing, and identifying flows based on other flow-identifying information, such as their associated 5-tuple.

By using TCP sequence IDs to perform flow/server matching, the load-balancers can achieve fast and efficient load-balancing for small and/or short-lived flows. This type of balancing achieves better flow optimization, as compared to purely state-based balancing, by making state-based decisions for new and large traffic flows, while avoiding the need to persist server-load information for smaller flows.

FIG. 1 illustrates a schematic diagram of an example network environment 100 in which a load-balancing technique of the disclosed technology can be implemented. Network environment 100 includes a data center 120, which can represent one or more data centers and/or networks. For example, data center 120 can be a single data center or may include multiple of data centers. Data center 120 can be physically located in a same geographic location or distributed throughout multiple locations. Moreover, data center 120 can include forwarder-side and server-side architectures or components as will be further described.

Client 102 can connect with routers 106-1 through 106-N (collectively "106" hereinafter) in the data center 120 via a network 104. Client 102 can be any computing device, such as a laptop, a desktop, a tablet computer, a mobile phone, a server, a smart device (e.g., smart television, smart watch, etc.), an internet of things (IoT) device, a remote network or data center, etc. Additionally, network 104 can include any number or type of networks, such as a private network (e.g., local area network), a public network (e.g., the Internet), a hybrid network (e.g., virtual private network), a cloud network, etc.

Routers 106 can serve as edge devices in data center 120, and route traffic to and from data center 120. Thus, routers 106 can connect data center 120 with network 104, client 102, and any other external networks or devices. Routers 106 can serve as egress and ingress points for data center 120. Routers 106 can also route traffic internally within data center 120 to other routers or switches, network devices or services (e.g., appliances, firewalls, load-balancers, etc.), and application servers 110-1 through 110-N (collectively "110" hereinafter) in data center 120.

Application servers 110 can include physical machines or resources hosting applications, isolated environments, or services in data center 120. For example, application servers 110 can be physical servers running various applications in data center 120. Application servers 110 can run some or all of their applications in isolated environments, such as in VMs or software containers. In some cases, an application can by hosted by, and/or run on, multiple application servers 110 in data center 120. For example, application servers 110 can run instances of an application (e.g., virtual instances, replicas, parallel instances, mirror instances, etc.). To illustrate, an application can run on multiple application servers 110, to allow the multiple application servers 110 to load-balance application traffic, and/or provide redundancy (e.g., backup or standby), fault-tolerance, high-availability, scalability, etc., for the application. Application servers 110 can run a full application or instance of the application, or a portion of the application, such as a function in a service chain configuration.

Application servers 110 can include a physical network interface, e.g., a Network Interface Card (NIC) to communicate with other devices or services (e.g., devices or services in the network environment 100). The physical network interface can be assigned a physical prefix or network address for such communications. Application servers 110 can also include one or more virtual interfaces (e.g., vNICs) that provide virtualized or abstract representations of network interfaces and connections. Virtual interfaces can provide added flexibility and network capabilities, as well as various other benefits or services, such as aggregation of links or data, isolation of data or networks, decoupling of application and system traffic, expansion of network interfaces, network redundancy, dedicated links, and so forth. Virtual interfaces can be assigned virtual addresses (e.g., VIPs) in data center 120. The virtual addresses can identify the virtual interfaces as well as any applications or isolated environments associated with the virtual addresses on application servers 110.

For example, an application can be assigned a virtual address in the data center 120, which can be used to identify the application in data center 120 and route traffic to and from the application. The virtual address can be used to steer traffic to and from a virtual instance of the application running on one or more of the application servers 110. In some cases, the virtual address can be mapped to the same application on multiple application servers 110, and can be used to communicate with an instance of the application on any of the multiple application servers 110.

Application servers 110 can include a virtual switch, which can route traffic to and from the application servers 110. For example, a virtual switch can route traffic between physical and virtual network interfaces on an application server, between applications and/or isolated environments on the application server, and between the application server and devices or applications outside of the application server. To illustrate, an application server can run multiple workloads, such as, applications in different virtual machines or containers, assigned to different virtual interfaces and virtual addresses. A virtual switch on the application server can route traffic to and from different workloads by translating the virtual addresses of the workloads and communicating with the virtual interfaces as well as other network interfaces such as the physical network interface(s) on the application server.

Data center 120 can also include load-balancers 108-1 through 108-N (collectively "108" hereinafter). Load-balancers 108 can communicate traffic between routers 106 and application servers 110. Moreover, load-balancers 108 can provide load-balancing and forwarding services for traffic associated with application servers 110. Load-balancers 108 can select application servers 110 for a given flow to distribute flows and loads between the application servers 110 and steer traffic accordingly. As discussed in further detail below, application servers 110 can steer traffic flows based sequence number identification information contained in packet-header information for packets received from client (source device) 102.

Figure 2:
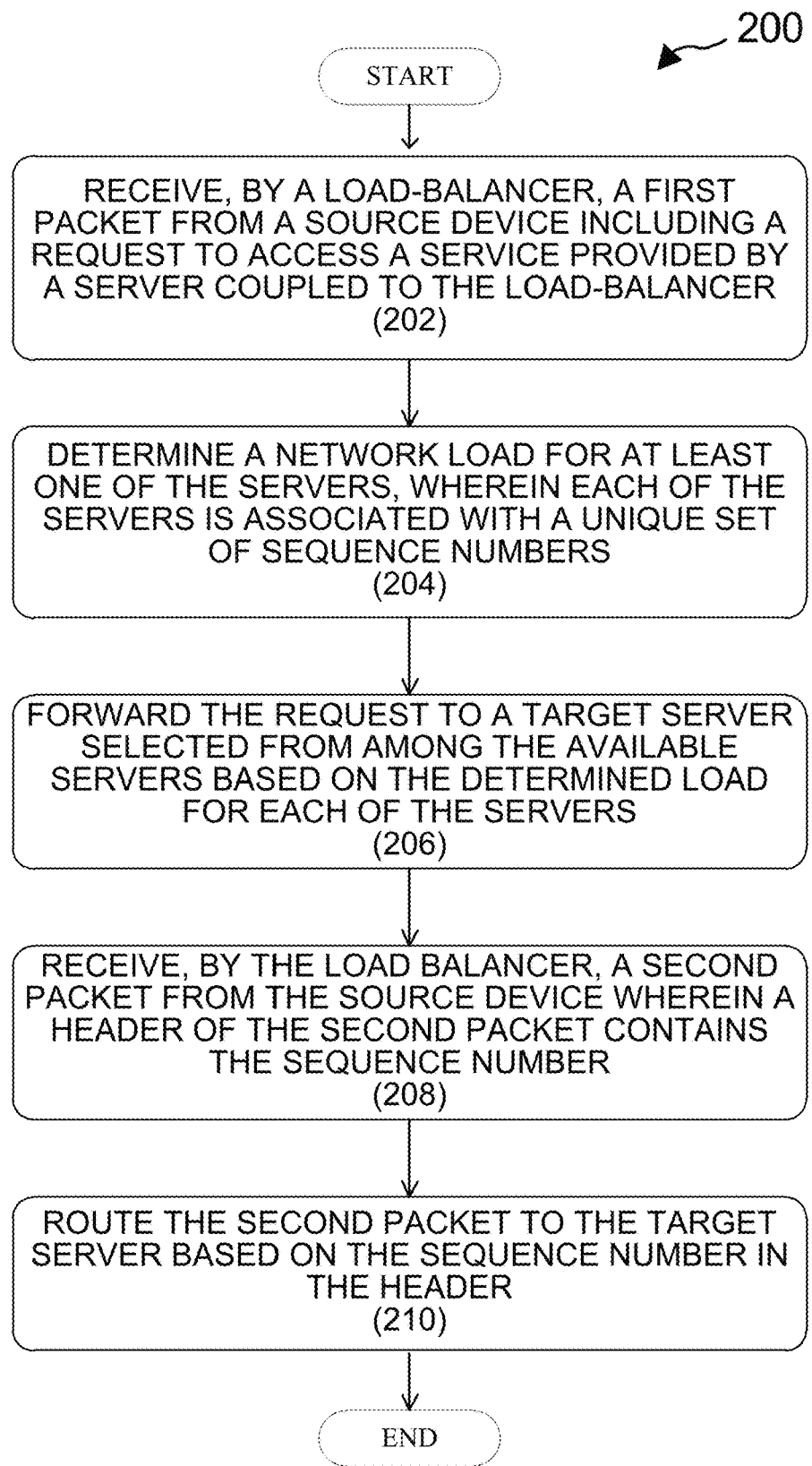
FIG. 2 illustrates an example process for implementing a load-balancing technique of the subject disclosure.

FIG. 2 illustrates a flow diagram of an example process 200 for implementing a load-balancing technique of the disclosed technology. Process 200 begins when a first packet is received, at a load balancer, from a source device (202). As discussed above, the source device can be a client device, such as client device 102, discussed above with respect to FIG. 1. Additionally, the first packet can be received at a load-balancer, such as any of load-balancers 108, described above.

The first packet can include a request from the source device to access a service (e.g., an application) provided by a server that is communicatively coupled to the load-balancer. That is, the first packet can include information including at least a portion of a request for resources/services provided by a server reachable by the receiving load-balancer. Further to the environment illustrated in FIG. 1, the source device (e.g., client 102), can request resources/services provided by any of application servers 110.

After the first packet is received by the load-balancer, the load-balancer determines a server-load for one or more of the connected servers (204). As discussed above, determinations of server-loads can be based on absolute or relative measures of CPU utilization, and/or based on other network characteristics, such as network path or traffic flow information. Determinations of loads for each of the connected servers can be triggered in response to the receipt of one or more packets for a new traffic flow, such that server load determinations are not performed for all traffic received at the load-balancer. In practice, each of the servers connected with the load-balancer are associated with a unique set of sequence numbers, such as, Transmission Control Protocol (TCP) sequence ID numbers.

Subsequently, the load-balancer forwards the request to a target server that is selected from among the available servers, based on the corresponding load for each server. That is, the request received by the load-balancer is forwarded to a selected target (destination) server based on an initial determination of relative server capacity. In this manner, initial destination routing for a new request (flow) is made by the load-balancer based on actual server load states.

After the request is received from the load-balancer at the target server, the target server can reply to the source device directly, i.e., without communicating via the load-balancer. In practice, the reply of the target server includes a unique sequence number selected for insertion into the packet/s transmitted in the reply. The selected sequence number can correspond with an unallocated identifier that is selected from among the available sequence numbers in the target server's associated sequence ID set. As such, the sequence number (or sequence ID) can correspond with a particular traffic flow between the source device and the server. In some aspects, the sequence ID can be a TCP sequence ID that is embedded in packet header information of the packets for the corresponding flow.

Once the source device receives the server's reply, subsequent packet transmissions by the source device are provided to the load-balancer and automatically routed to the correct target server based on sequence ID information (208, 210). That is, one or more subsequent packets received by the load-balancer, from the source device, can be routed by the load-balancer (to the correct target server) by identifying the sequence ID in the packet header information.

In some aspects, the sequence ID provided in the packets transmitted by the source device can be a different value than that of the sequence ID received by the source device from the target server. For example, the source device can be configured to derive or compute a new sequence ID value based on the original sequence ID value received from the server as well as a number/size of packets received from the server. By way of example, the sequence ID value placed in packet header information by the source device can equal the original sequence ID value incremented by a number of TCP data bytes transmitted by the server. If, for example, the initial sequence ID value transmitted by the server to the source device was 2600, and 858 TCP data bytes were transmitted by the server in a previous frame, then the new sequence ID value that is used by the source device can be 3458 (2600+858).

In some aspects, the routing of incoming packets based on sequence ID information can be performed by the load-balancer using a table of server-state values that map sequence ID information to destination servers. As such, the load-balancer can make fast routing decisions for incoming packets of existing flows by quickly reference sequence IDs in packet header information, without the need to store (or frequently update) server-load information.

As discussed above, sequence ID values may eventually exceed a range associated with any given server. In some implementations, the load-balancer is configured to detect flows using sequence IDs having values that are likely to exceed a designated range for the associated server. In such instances, the load-balancer can begin identifying the flow using other types of information, including but not limited to the flow's corresponding 5-tuple. In some aspects, this transition can also cause the load-balancer to perform balancing for packets of the related flow based on server-load information. That is, detections of out-of-range sequence ID values can re-trigger load-based balancing. As such, large flows can be selectively identified and managed based on server-load information, whereas smaller flows can be efficiently routed using in-range ID values, e.g., based on server-state information.

Figure 3:
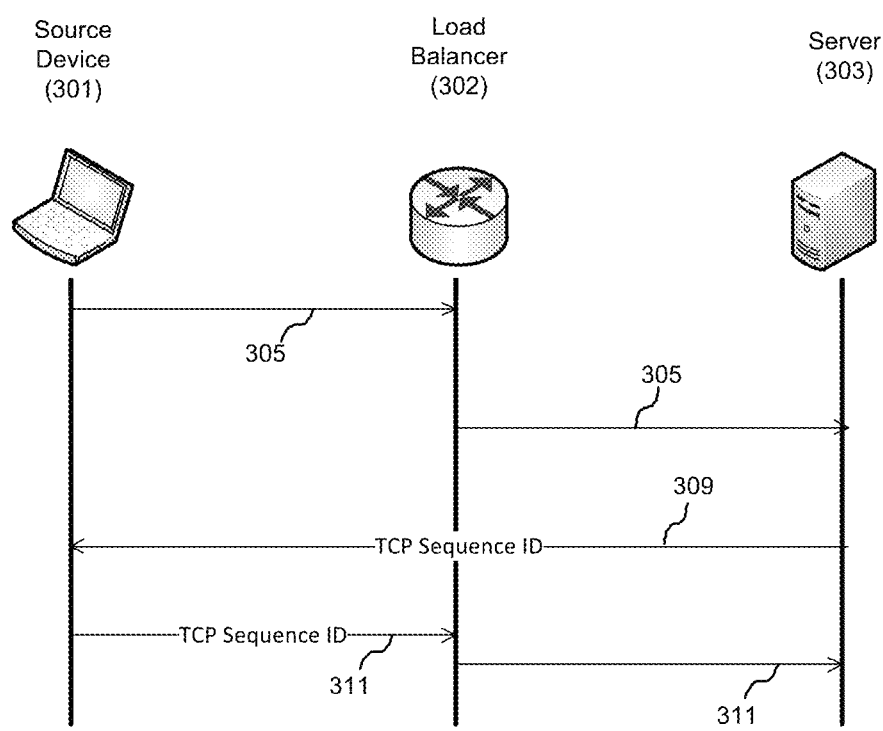
FIG. 3 conceptually illustrates a timing diagram of example network communications used to implement a load-balancing technique of the disclosed technology.

FIG. 3 conceptually illustrates an example timing diagram of device communications used to implement a load-balancing technique of the disclosed technology. In the illustrated example, source device 301 can represent any network device from which a server request can originate (e.g., client device 102, discussed above); load-balancer 302 can represent any load-balancing network node, including physical boxes and/or virtually instantiated devices (e.g., load-balancers 108, discussed above); and target server 303 can represent a single network device or a combination of physical/virtual devices, for example, that is/are configured to provide information or processing to a requesting source device 301.

In practice, source device 301 transmits a request 305 to target server 303 via load-balancer 302. After request 305 is received at load-balancer 302, load-balancer 302 reads packet header information of the request to determine if the request corresponds with a new traffic flow (e.g., based on the absence of sequence ID information), or if the request corresponds with a legacy flow for which routing has been previously determined (e.g., based on the presence of a sequence ID in the packet header).

If a sequence ID exists in the packet header, load-balancer 302 can route the request to the corresponding server, for example, by referencing a table of server-state entries that associate server/sequence ID pairs. Alternatively, if no sequence ID information exists in the request, then the load-balancer can determine server-loads for two or more available servers to determine the optimal target/destination server for routing of the request.

In the example of FIG. 3, request 305 represents a new traffic flow from source device 301, and is routed to available target server 303 by load-balancer 302. The initial routing of source device traffic to a target server can be performed by the load-balancer based on server-load information for one or more servers. As such, initial balancing of new flows is based on server CPU usage or capacity information for the available servers. After target server 303 receives request 305, reply 309 is generated by target server 303 that includes a TCP sequence ID, for example, that is selected by target server 303 from among a pre-allocated set of TCP sequence ID's. Reply 309 is then forwarded directly to source device 301, e.g., without the need of routing by load-balancer 302.

After the TCP sequence ID is received at source device 301, subsequent packets transmitted from source device 301 to target server 303 include the TCP sequence ID to facilitate routing by load-balancer 302. That is, source device 301 inserts the TCP sequence ID indicated by target server 303 and the subsequent traffic is communicated to target server 303 in the same flow. In the example of FIG. 3, a subsequent (second) packet 311 transmitted by source device 301 to target server 303 is first received at load-balancer 302. Load-balancer 302 then reads the packet heading information and routes the second packet 311 to target server 303.

The TCP sequence ID 311 selected by source device 301 can include a new value based on a value of the TCP sequence ID in reply 309 received from target server 303. In some aspects, the value corresponds with a value of the received TCP sequence ID 309 that is incremented based on the size of the data frame received from target server 303. By way of example, if a value associated with TCP sequence ID 309 is 2000, and a previously transmitted frame was 1300 TCP bytes, the TCP sequence ID 311 provided by source device 301 be 3300 (i.e., 2000+1300).

By relying on sequence number identification information in the packet header, load-balancer 302 can make fast routing decisions for incoming packets without the need to frequently/constantly update server-load information. This technique has the advantage of performing efficient traffic balancing between servers that is (initially) informed by server-load information, yet avoids the need to persist load information at load-balancer 302 for smaller and/or short-lived flows.

Figure 4:
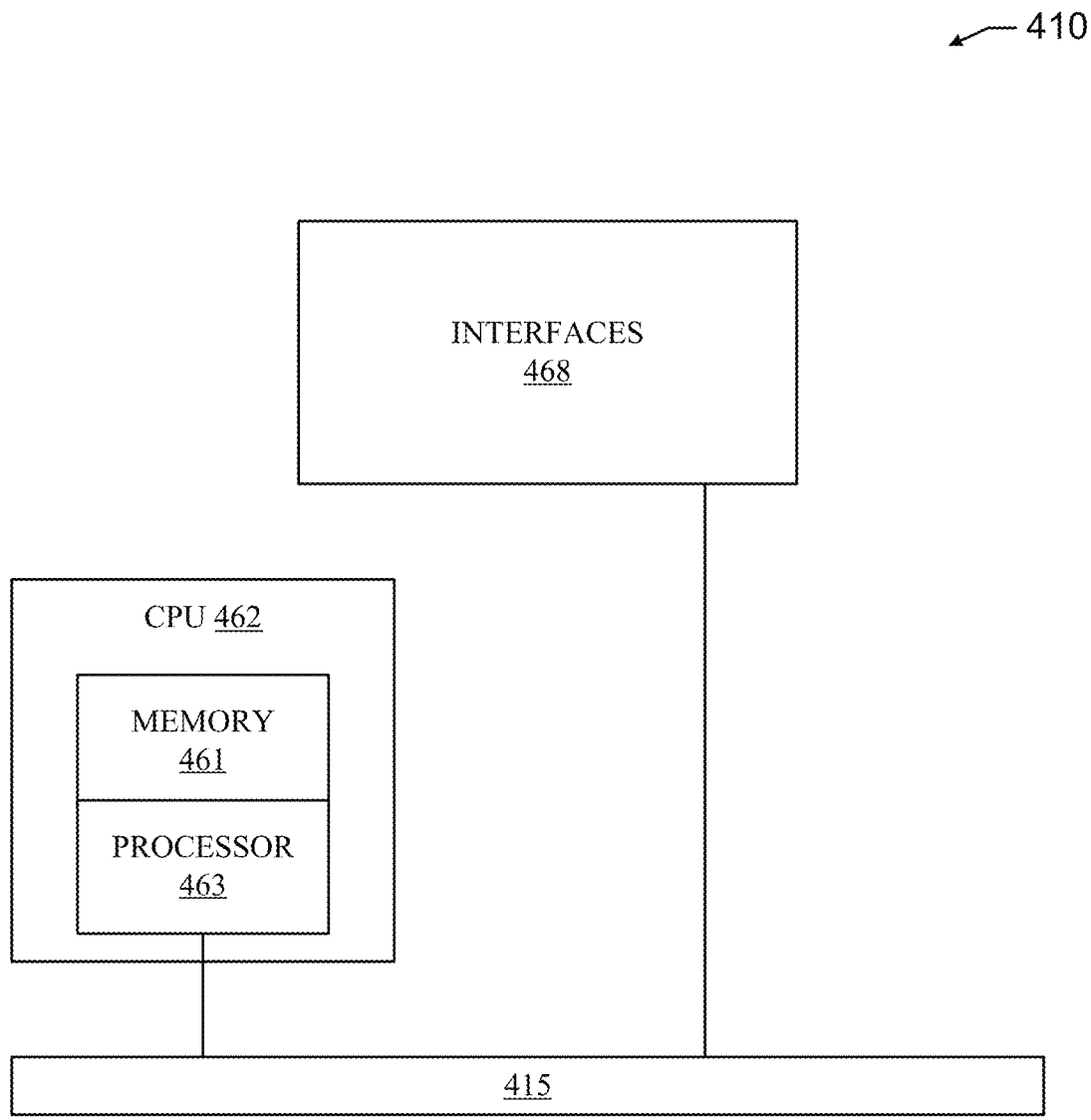
FIG. 4 illustrates an example network device in accordance with various embodiments.
Figure 5:
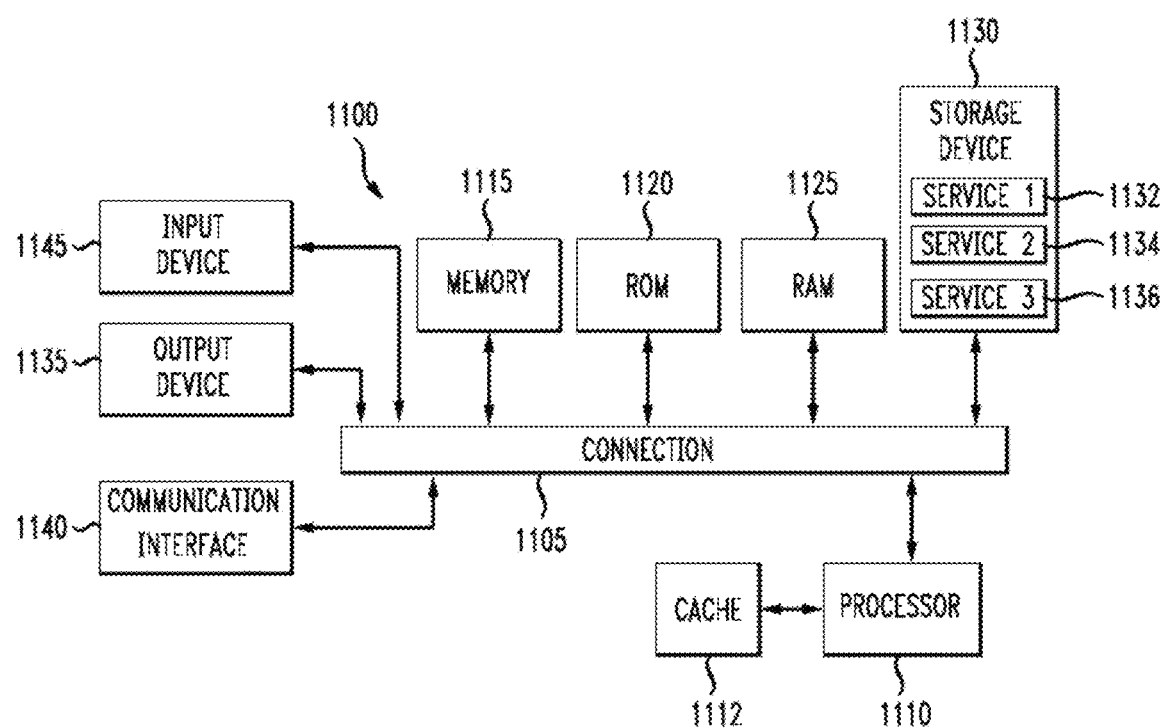
FIG. 5 illustrates an example computing device in accordance with various embodiments.

The disclosure now turns to FIGS. 4 and 5, which illustrate example network devices and computing devices, such as switches, routers, load-balancers, client devices, and so forth.

FIG. 4 illustrates an example network device 410 suitable for performing switching, routing, load-balancing, and other networking operations. Network device 410 includes a central processing unit (CPU) 462, interfaces 468, and a bus 415 (e.g., a PCI bus). When acting under the control of appropriate software or firmware, the CPU 462 is responsible for executing packet management, error detection, and/or routing functions. CPU 462 preferably accomplishes all these functions under the control of software including an operating system and any appropriate applications software. CPU 462 may include one or more processors 463, such as a processor from the INTEL X86 family of microprocessors. In some cases, processor 463 can be specially designed hardware for controlling the operations of network device 410. In some cases, a memory 461, e.g., non-volatile Random Access Memory (RAM), Read Only Memory (ROM), etc. also forms part of CPU 462. However, there are many different ways in which memory could be coupled to the system.

Interfaces 468 may be provided as modular interface cards (sometimes referred to as "line cards"). As such, they can control the sending and receiving of data packets over the network and sometimes support other peripherals used with the network device 410. Among the interfaces that can be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet over SONET/SDH (POS) interfaces, Fiber-Distributed Data Interfaces (FDDI), and the like. Generally, these interfaces may include ports appropriate for communication with the appropriate media. In some cases, they may also include an independent processor and, in some instances, volatile RAM.

Independent processors may control such communications intensive tasks as packet switching, media control, signal processing, crypto processing, and management. By providing separate processors for the communications intensive tasks, these interfaces allow CPU 462 to efficiently perform routing computations, network diagnostics, security functions, etc. Although the system shown in FIG. 4 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 410.

Regardless of the network device's configuration, it may employ one or more memories or memory modules (including memory 461) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 461 could also hold various software containers and virtualized execution environments and data.

Network device 410 can also include an application-specific integrated circuit (ASIC), which can be configured to perform routing and/or switching operations. The ASIC can communicate with other components in network device 410 via bus 415, to exchange data and signals and coordinate various types of operations by network device 410, such as routing, switching, and/or data storage operations, for example.

FIG. 5 illustrates a computing system 1100 wherein the components of the system are in electrical communication with each other using a connection 1105, such as a bus. System 1100 includes a processing unit (CPU or processor) 1110 and a system connection 1105 that couples various system components including the system memory 1115, such as read only memory (ROM) 1120 and random access memory (RAM) 1125, to the processor 1110. System 1100 can include a cache of high-speed memory connected directly with, in close proximity to, or integrated as part of the processor 1110. System 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. Memory 1115 can include multiple different types of memory with different performance characteristics. processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the actual processor design. The processor 1110 may be a completely self-contained computing system, containing multiple cores or processors, a bus, memory controller, cache, etc. A multi-core processor may be symmetric or asymmetric.

To enable user interaction with computing system 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with system 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

Storage device 1130 can include services 1132, 1134, 1136 for controlling the processor 1110. Other hardware or software modules are contemplated. Storage device 1130 can be connected to system connection 1105. In one aspect, a hardware module that performs a particular function can include the software component stored in a computer-readable medium in connection with the necessary hardware components, such as processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
receiving, by a load-balancer, a first packet from a source device, the first packet comprising a request to access a service provided by a server coupled to the load-balancer;
determining, by the load-balancer, a load for each of a plurality of servers, each of the plurality of servers is associated with a unique set of sequence numbers; and
forwarding the request to a target server selected from among the plurality of servers based on the load for each of the plurality of servers, the request configured to cause the target server to issue a reply to the source device, the reply comprising a sequence number selected from the unique set of sequence numbers corresponding with the target server,
wherein
the load-balancer includes a table associating each of the plurality of servers with its corresponding unique set of sequence numbers.

2. The computer-implemented method of claim 1, further comprising:
receiving, by the load-balancer, a second packet from the source device, wherein a header of the second packet contains the sequence number; and
routing, by the load-balancer, the second packet to the target server based on the sequence number in the header.

3. The computer-implemented method of claim 2, wherein routing the second packet to the target server includes:
identifying the target server as a destination for the second packet based on the sequence number; and
forwarding the second packet to the target server.

4. The computer-implemented method of claim 1, wherein the unique set of sequence numbers corresponding with the target server are Transmission Control Protocol (TCP) sequence numbers.

5. The computer-implemented method of claim 1, wherein the reply comprises at least one packet for which a packet header contains the sequence number.

6. The computer-implemented method of claim 1, wherein the load-balancer is configured to disregard state information for servers associated with active traffic flows.

7. A system comprising:
one or more processors;
a network interface coupled to the one or more processors, the network interface configured to transact data with a computer network; and
a non-transitory computer-readable storage medium coupled to the one or more processors, the non-transitory computer-readable storage medium containing instructions which, when executed by the one or more processors, cause the system to:
receive, by a load-balancer, a first packet from a source device, the first packet comprising a request to access a service provided by a server coupled to the load-balancer;
determine, by the load-balancer, a load for each of a plurality of servers, each of the plurality of servers is associated with a unique set of sequence numbers; and
forward the request to a target server selected from among the plurality of servers based on the load for each of the plurality of servers, the request configured to cause the target server to issue a reply to the source device, the reply comprising a sequence number selected from the unique set of sequence numbers corresponding with the target server,
wherein
the load-balancer includes a table associating each of the plurality of servers with its corresponding unique set of sequence numbers.

8. The system of claim 7, wherein the operations include:
receiving, by the load-balancer, a second packet from the source device, wherein a header of the second packet contains the sequence number; and
routing, by the load-balancer, the second packet to the target server based on the sequence number in the header of the second packet.

9. The system of claim 8, wherein routing the second packet to the target server includes:
identifying the target server as a destination for the second packet based on the sequence number; and
forwarding the second packet to the target server.

10. The system of claim 7, wherein the unique set of sequence numbers corresponding with the target server are Transmission Control Protocol (TCP) sequence numbers.

11. The system of claim 7, wherein the reply comprises at least one packet for which a packet header contains the sequence number.

12. The system of claim 7, wherein the load-balancer is configured to disregard state information for servers associated with active traffic flows.

13. A non-transitory computer-readable storage medium comprising instructions stored therein, which when executed by one or more processors, cause the one or more processors to perform operations comprising:
receiving, by a load-balancer, a first packet from a source device, the first packet comprising a request to access a service provided by a server coupled to the load-balancer;
determining, by the load-balancer, a load for each of a plurality of servers, each of the plurality of servers is associated with a unique set of sequence numbers; and
forwarding the request to a target server selected from among the plurality of servers based on the load for each of the plurality of servers, the request configured to cause the target server to issue a reply to the source device, the reply comprising a sequence number selected from the unique set of sequence numbers corresponding with the target server,
wherein
the load-balancer includes a table associating each of the plurality of servers with its corresponding unique set of sequence numbers.

14. The non-transitory computer-readable storage medium of claim 13, wherein the operations include:
receiving, by the load-balancer, a second packet from the source device, wherein a header of the second packet contains the sequence number; and
routing, by the load-balancer, the second packet to the target server based on the sequence number in the header of the second packet.

15. The non-transitory computer-readable storage medium of claim 14, wherein routing the second packet to the target server includes:
identifying the target server as a destination for the second packet based on the sequence number; and
forwarding the second packet to the target server.

16. The non-transitory computer-readable storage medium of claim 13, wherein the unique set of sequence numbers corresponding with the target server are Transmission Control Protocol (TCP) sequence numbers.

17. The non-transitory computer-readable storage medium of claim 13, wherein the reply comprises at least one packet for which a packet header contains the sequence number.

\* \* \* \* \*